Figure 1:
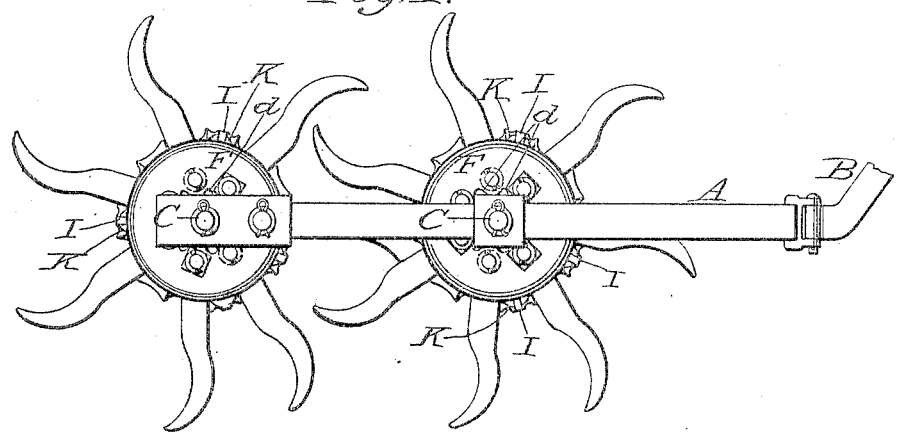

No. 797,443. PATENTED AUG. 15, 1905.
A. LINDGREN.
DIGGER HEAD FOR STUBBLE DIGGERS.
APPLICATION FILED JUNE 1, 1905.

Witnesses
Inventor
August Lindgren
By P. T. Dodge
Attorney

UNITED STATES PATENT OFFICE.

AUGUST LINDGREN, OF MOLINE, ILLINOIS, ASSIGNOR TO MOLINE PLOW COMPANY, A CORPORATION OF ILLINOIS.

DIGGER-HEAD FOR STUBBLE-DIGGERS.

No. 797,443. Specification of Letters Patent. Patented Aug. 15, 1905.

Application filed June 1, 1905. Serial No. 263,267.

*To all whom it may concern:*

Be it known that I, AUGUST LINDGREN, of Moline, county of Rock Island, and State of Illinois, have invented a new and useful Improvement in Digger-Heads for Stubble-Diggers, &c., of which the following is a specification.

My invention relates to digger-heads which are employed in connection with the stubble-diggers used in the cultivation of sugar-cane, and particularly serviceable in picking the surface about the cane-roots, so that the young cane-shoots may come through. When the digger-heads have teeth which are loose or have free play, they should not dig up the roots from the soil.

The object of my invention is to provide an improved digger-head for this class of apparatus possessing several advantages of construction not heretofore known.

Revolving digger-heads, or rather heads having an intermittent rotary motion, are not new in this art, and while I am aware that digger-heads have been constructed which employ teeth having more or less free play by my specific arrangement of the spacing-lugs I prevent the clogging of dirt in the openings between the teeth and lugs, thus insuring the proper amount of movement for the teeth. Furthermore, in the production of digger-heads having the parts integral coring is an objectionable feature. In my improved digger-head the necessity of this is obviated, since I employ separable disks provided with interlocking lugs, whereby the motion of one disk with respect to the other is prevented.

With these objects in view my invention consists of the combination of parts hereinafter referred to in the specification and shown in the drawings, in which—

Figure 2:
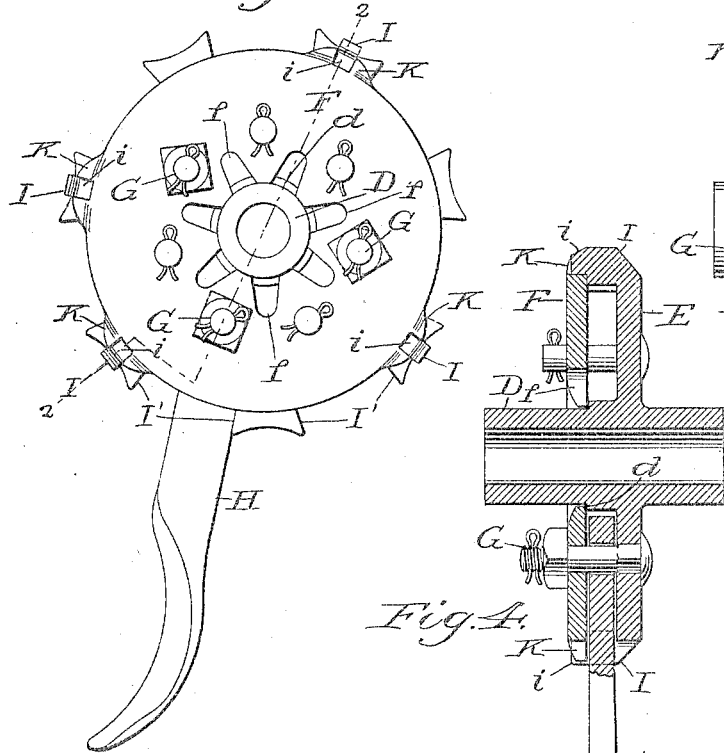
Figure 3:
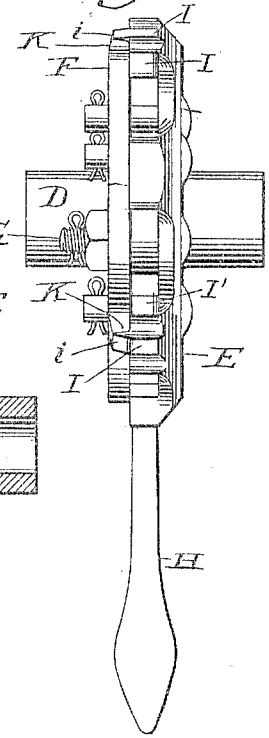

Figure 1 is a perspective view of a portion of a stubble-digger or cultivator, showing a gang of my improved digger-heads in working position. Fig. 2 is a side elevation of one of the heads with the teeth partially removed. Fig. 3 is an end elevation further showing the construction of the interlocking lugs, and Fig. 4 is a vertical sectional view on the line 2 2 of Fig. 2.

Referring to Fig. 1, A is the picker-frame of a stubble-digger connected to the main frame of the machine by the yoke B. The picker-frame is provided with shafts C, on which the digger-heads are journaled, the heads being sufficiently spaced apart on the said shaft by virtue of the length of their hubs. The manner of applying the heads to the machine forms no part of the present invention, which is concerned solely with the specific construction of the heads.

Figure 4:

Referring now to Figs. 2, 3, and 4, D represents the hub of one of my digger-heads, preferably loosely journaled on the shaft C and capable of intermittent rotary motion thereon. The digger-head in its preferred form consists of two separable circular disks or disk-like bodies E F, one of which, E, is cast integrally with and projects diametrically from the hub D. The disk F incloses the hub D and abuts against an enlarged portion or shoulder $d$ of the said hub, this shoulder serving, in connection with the lugs hereinafter referred to, to space the disk F the proper distance from the disk E. The two disks or disk-like faces are secured together by means of bolts G, which pass through serially-formed apertures in each of the disks and act as pivot-pins for the teeth. The latter, which are denoted by H, may be of any number, preferably from six to eight, and are provided with curved outer points, which enter the soil when the apparatus is in use, and straight flat portions which enter the space formed between the two disks. By means of holes at their inner ends the teeth are pivotally mounted on the bolts or pins G, on which they have a limited amount of play. The pivotal centers of these teeth are placed, preferably, near to the hub and away from the periphery of the disks, which, with the provision of the spacing-lugs placed about the outer circumference of the disks, insures the proper amount of motion desired for the teeth, as it is clearly obvious that the length of the arcs in which the teeth move will be less with the line of pivotal centers in this position than if the teeth were pivoted at a point near the periphery. The disk F is cut away at its central portion, so that it may be placed in position on the hub D, and this cut-away portion is extended at intervals into radial openings $f$, which serve to discharge the dirt and small stones that are thrown into the space between the two separable disks. Placed at intervals about the outer circumference of the disk E are overhanging lugs I, preferably of a number to correspond with the number of digger-teeth employed. These lugs project beyond the peripheral edge of the disk and also extend in a direction at right angles to the plane of the disk, this latter extending portion being of a width equal to the distance to which the disks are spaced apart, since the disk F abuts against the said lugs. Several of these lugs, or all, if desired, are provided at their middle portions with projections $i$. The disk F is provided at intervals about its periphery with lugs K, which project beyond the edge of the disk, but in the same plane thereof, the lugs corresponding in number and location to the overhanging lugs on the disk E, and are cut away at their middle portions, whereby they are adapted to receive and to interlock with the projections $i$ on the lugs of said disk E. These interlocking lugs are functional only to a limited extent in preventing the separation of the disks, but serve, chiefly, as stops for the movement of the teeth and to prevent a relative slip or motion of the disks about their common axis. However, in placing them beyond or outside of the peripheral edges of the disks I secure an important result in preventing the undue clogging of the passages with small stones and dirt, which in practice is unavoidably thrown into the open space between the two disks. It will be readily seen that in providing the lugs in the position shown the spaces or avenues of escape for the dirt between the teeth and the edges I' of the said lugs will be much larger than would be the case were the lugs set in farther or entirely within the peripheries of the disks, as has always been the case heretofore. In a very small space between the teeth and the edges of the lugs the dirt would clog and prevent the free movement of the teeth on their pivot-bolts, whereas in my improved construction the dirt having ample passage for its movement would pass on and immediately fall out of the opening $f$. Furthermore, the liability of the teeth H becoming bent from forcible contact with unyielding rocks in the soil is obviated by the disposition of the lugs outside of the peripheral edges of the disks, as the amount of leverage which could be exercised on the teeth to bend them with the lugs in this position and the pivot-bolts far in toward the hub is distinctly less than would be the case were the lugs inclosed by the disks, with the pivot-pins nearer to the outer periphery.

The advantages of constructing the disks separable will be apparent. In the integral structures the hollow space between the two disks is cored out; but in my structure this coring of course is dispensed with.

The teeth may be expeditiously removed should one of them become broken or twisted, and should large stones become immovably lodged in the hollow space the matter is easily remedied by the removal of the disk F.

Changes in the exact form and proportions of the parts may be made without departing from the spirit of the invention or sacrificing any of its advantages.

Having thus described my invention, what I claim is—

1. A digger-head for stubble-diggers and cultivators, comprising a pair of disks, digger-teeth mounted between the two disks, lugs on one of the disks, and means on the second disk whereby it may be interlocked with the lugs on the first-mentioned disk, substantially as described.

2. A digger-head for stubble-diggers and cultivators, comprising a pair of disks, digger-teeth mounted between the two disks, and lugs on the disks extending beyond the periphery of the disks, substantially as described.

3. A digger-head for stubble-diggers and cultivators, comprising a pair of disks suitably spaced apart, digger-teeth mounted between the two disks, and lugs on the disks provided with interlocking means, the said lugs extending beyond the peripheries of the disks, substantially as described.

4. A digger-head for stubble-diggers and cultivators, consisting of a pair of disks suitably spaced apart, overhanging lugs on one of the disks and locking projections on the said lugs, and peripheral lugs on the other disk having recesses whereby they are adapted to interlock with the lugs on the first-mentioned disk, and digger-teeth loosely mounted between the two disks, substantially as described.

5. A digger-head for stubble-diggers and cultivators, consisting of a pair of disks, overhanging lugs on one of the disks and projecting beyond the periphery of the said disk and peripheral lugs on the other disk having recesses whereby they are adapted to interlock with the lugs on the first-mentioned disk, and digger-teeth loosely pivoted between the two disks, substantially as described.

6. A digger-head for stubble-diggers and cultivators, comprising a hub portion with a disk integrally connected thereto and projecting diametrically therefrom, lugs projecting beyond the periphery of the said disk, a second disk suitably spaced apart from the first-mentioned disk, lugs on the periphery of the second disk interlocking with the lugs on the first-mentioned disk and digger-teeth loosely pivoted between the two disks, substantially as described.

7. A digger-head for stubble-diggers and cultivators, comprising a hub portion with a disk suitably mounted thereon lugs placed at intervals on the said disk and projecting beyond its periphery, locking projections on the said lugs, a second disk suitably spaced apart from the first-mentioned disk, lugs on the second disk provided with means whereby they may interlock with the projections on the lugs of the first-mentioned disk, digger-teeth loosely pivoted between the two disks, and openings in one of the disks to provide for the escape of dirt, substantially as described.

In testimony whereof I hereunto set my hand, this 24th day of May, 1905, in the presence of two attesting witnesses.

AUGUST LINDGREN.

Witnesses:
L. C. BLANDING,
C. H. LIPPINCOTT.